(12) United States Patent
Kagawa et al.

(10) Patent No.: US 6,836,305 B1
(45) Date of Patent: Dec. 28, 2004

(54) REFLECTION-TYPE, LIQUID CRYSTAL DISPLAY DEVICE AND PROCESS FOR PRODUCING THE SAME

(75) Inventors: Hiroyuki Kagawa, Hitachi (JP); Shinichi Komura, Hitachi (JP); Katsumi Kondo, Mito (JP); Yasunari Maekawa, Takasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/353,777

(22) Filed: Jul. 15, 1999

(30) Foreign Application Priority Data

Jul. 15, 1998 (JP) .......................................... 10-200475

(51) Int. Cl.[7] ..................... G02F 1/1335; G02F 1/1337
(52) U.S. Cl. ...................... 349/113; 349/123; 349/106
(58) Field of Search ................................ 349/113, 123, 349/106

(56) References Cited

U.S. PATENT DOCUMENTS

| | | | | |
|---|---|---|---|---|
| 3,787,110 A | * | 1/1974 | Berreman et al. .......... | 350/160 |
| 4,456,336 A | * | 6/1984 | Chung et al. ............... | 350/338 |
| 5,965,691 A | * | 10/1999 | Gibbons et al. ............ | 528/353 |
| 6,219,120 B1 | * | 4/2001 | Sasaki et al. ............... | 349/113 |
| 6,229,586 B1 | * | 5/2001 | Date et al. .................. | 349/113 |
| 6,373,538 B2 | * | 4/2002 | Okumura et al. ........... | 349/106 |
| 6,407,784 B1 | * | 6/2002 | Kanou et al. ............... | 349/113 |
| 6,414,734 B1 | * | 7/2002 | Shigeta et al. .............. | 349/113 |
| 6,437,844 B1 | * | 8/2002 | Hattori et al. .............. | 349/129 |

FOREIGN PATENT DOCUMENTS

| | | |
|---|---|---|
| JP | B-49-11541 | 3/1974 |
| JP | A-54-145794 | 11/1979 |
| JP | B-1-59571 | 12/1989 |
| JP | A-4-168441 | 6/1992 |
| JP | A-4-204738 | 7/1992 |
| JP | A-6-167708 | 6/1994 |
| JP | A-8-201802 | 8/1996 |
| JP | A-9-113893 | 5/1997 |
| JP | A-10-3168 | 1/1998 |

OTHER PUBLICATIONS

Southward et al, "Control of Reflectivity and Surface Conductivity in Metallized Polyimide Films Prepared via in Situ Silver (I) Reduction" Chem. Mater. 1997,9, 501–510.*
R.E. Southward et al, "Chemistry of Materials", vol. 7, pp. 2171–2180, Jul. 1995.
R.E. Southward et al, "Chemistry of Materials", vol. 9, pp. 501–510, Sep. 1997.

* cited by examiner

*Primary Examiner*—Robert H. Kim
*Assistant Examiner*—Mike Qi
(74) *Attorney, Agent, or Firm*—Antonelli, Terry, Stout & Kraus, LLP

(57) ABSTRACT

A reflection-type liquid crystal display device, having a pair of substrates, at least one of which is transparent, a liquid crystal layer sandwiched between the pair of substrates, a light reflector section provided between the liquid crystal layer and one of the pair of substrates, and a polymeric medium layer with fine silver particles precipitated on the surface, as formed at the light reflector section. The reflection-type liquid crystal display is produced by the steps of: applying a mixture containing monovalent silver and a photosensitive polymeric medium; exposing the mixture to light, thereby photolithographically forming a light reflector layer of desired pattern; heating the light reflector layer under a predetermined temperature condition, thereby precipitating fine silver particles on the surface of the light reflector layer; and confronting a transparent substrate with the light reflector layer-formed substrate, and sandwiching a liquid crystal layer between the substrates.

40 Claims, 9 Drawing Sheets

FIG. 12A
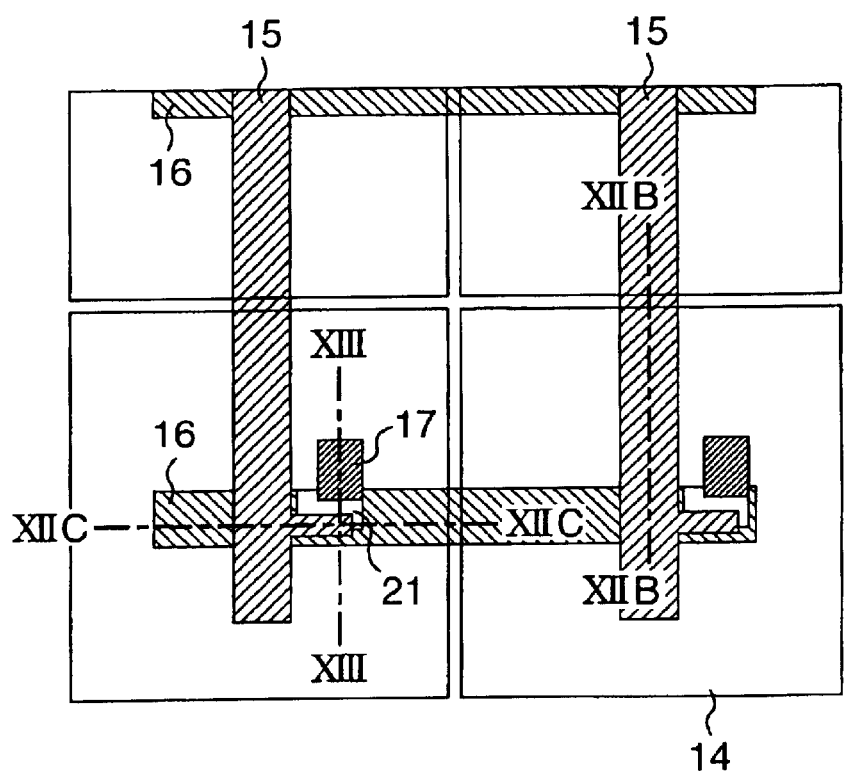
FIG. 12B
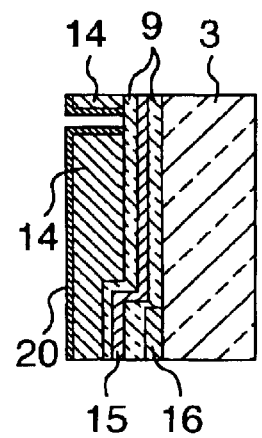
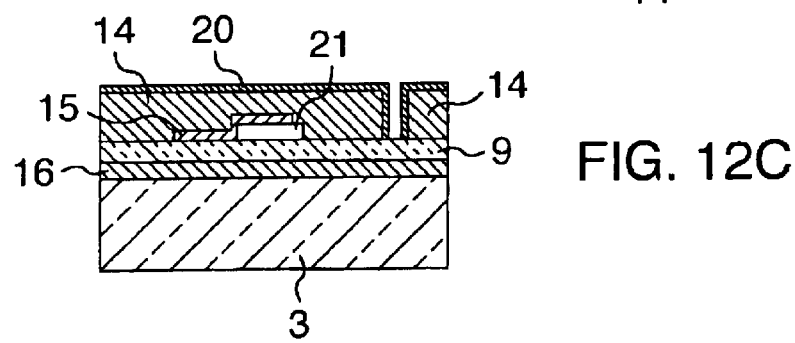
FIG. 12C

REFLECTION-TYPE, LIQUID CRYSTAL DISPLAY DEVICE AND PROCESS FOR PRODUCING THE SAME

BACKGROUND OF THE INVENTION

The present invention relates to a reflection-type liquid crystal display device and a process for producing the same. The reflection-type, liquid crystal display device comprises no light-emitting source by itself and thus its power consumption is lower and its shape can be made more compact than those of a backlight-type, liquid crystal device having a light source.

The reflection-type liquid crystal display device can be further classified into two types, i.e. type of an external light reflector provided outside the liquid crystal cell and type of internal light reflector layer provided inside the liquid crystal cell by vapor-deposition of such a metal as aluminum, silver, etc.

The reflection-type liquid crystal display device of internal light reflector type has a narrower gap between the display surface and the light reflector layer surface than that of the external light reflector type, and thus is free from shadow generation in the dark display region, which has been a problem in the external light reflector type, and also a high possibility of higher resolution can be expected. In case of an internal light reflector-type, color liquid crystal display device using a color filter, the displayed color can have a high color purity. Particularly incase the light reflector layer is electroconductive, the light reflector layer can be used as an electrode for applying a voltage to the liquid crystal layer at the same time.

In case of the reflection-type, liquid crystal display device, it is also necessary to scatter the reflected light. In this connection, JP-A-8-201802 and JP-A-9-113893 disclose a technique of providing the display device with a light-scatterable medium. JP-A-6-167708 proposes a method of forming a light-scattering surface on a light reflector layer acting also as an electrode by forming an uneven surface on the light reflector layer to give asperity thereto.

In case of the internal light reflector-type, liquid crystal display device, a light reflector layer is formed by vacuum vapor deposition of a metal, resulting in complication of process steps for producing a liquid crystal display device and also increase in the product cost. When the light reflector layer is used also as an electrode at the same time, a step of forming an electrode pattern, for example, patterning of a metal by photolithographic process, becomes a cost increase factor.

SUMMARY OF THE INVENTION

An object of the present invention is to provide a reflection-type liquid crystal display device having an internal light reflector layer, which can be produced in simple processes, and a process for producing the same.

In the present reflection-type liquid crystal display device, pattern formation of the light reflector layer can be made with ease and improved display quality.

A reflection-type liquid crystal display device according to the present invention comprises a pair of substrates, at least one of which is transparent, a liquid crystal layer sandwiched between the pair of substrates, and a light reflector section provided between the liquid crystal layer and one of the pair of the substrates, the light reflector section including a polymeric medium layer with fine silver particles precipitated on the surface. The fine silver particles reflect light.

A process for producing a reflection-type, liquid crystal display device according to the present invention comprises applying a mixture comprising monovalent silver and a photo-sensitive polymeric medium to a substrate, exposing the applied mixture to light, thereby photolithographically forming a light reflector layer of desired pattern, heating the light reflector layer under a predetermined temperature condition, thereby precipitating fine silver particles on the surface of the light reflector layer, and confronting a transparent substrate different from the light reflector layer-formed substrate with the light reflector layer-formed substrate to sandwich the liquid crystal layer the two substrates.

Another process for producing a reflection-type liquid crystal display device according to the present invention comprises the following steps, i.e. forming an electrode for actuating liquid crystals on a substrate, forming an insulating layer on the electrode, applying a mixture comprising monovalent silver and a photosensitive polymeric medium to the insulating layer, exposing the mixture to light, thereby photolithographically forming a light reflector layer of desired pattern, heating the light reflector layer under a predetermined temperature condition, thereby precipitating fine silver particles on the surface of the light reflector layer, confronting a transparent substrate different from the light reflector layer-formed substrate with the light reflector layer-formed substrate to sandwich the liquid crystal layer between the two substrates.

According to one embodiment of the present invention, the surface of the light reflector layer can be made electroconductive or non-conductive by adjusting the amount of silver to be contained in the polymeric medium. The surface of the electroconductive light reflector can act also as an electrode for actuating liquid crystals. The surface of the non-conductive light reflector layer can act also as an orientation layer.

According to another embodiment of the present invention, use of a silver-containing photosensitive polymeric medium as light reflector layer materials ensures easy photolithographic patterning of the light reflector layer.

According to other embodiment of the present invention, it is preferable to provide a scattering layer for scattering the reflected light. In place of providing a scattering layer, addition of an appropriate amount of fine non-conductive particles to the polymeric medium can give unevenness to the surface of the light reflector layer by the presence of the fine non-conductive particles therein, thereby enhancing a light scatterbility.

BRIEF DESCRIPTION OF THE DRAWINGS

FIGS. 12A, 12B and 12C are a plan view and cross-sectional views of a pixel structure of a reflection-type TFT liquid crystal display device according to other embodiment of the present invention, respectively.

DETAILED DESCRIPTION OF THE EMBODIMENTS

Figure 1:
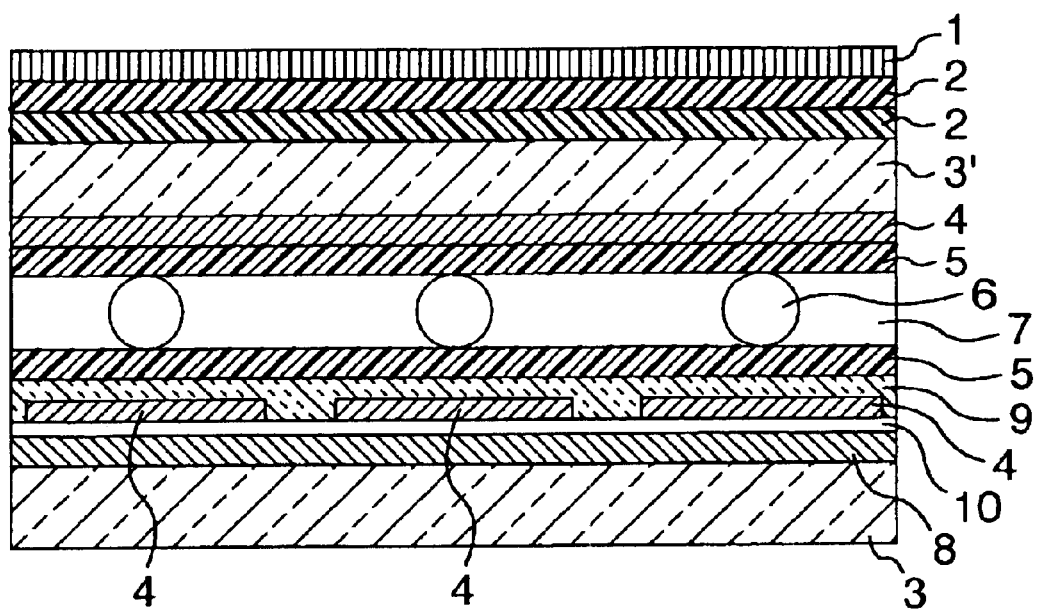
FIG. 1 is a schematic cross-sectional view of a reflection-type liquid display device according to one embodiment of the present invention.

FIG. 1 is a cross-section of a reflection-type liquid crystal display device provided with a light reflector layer inside the liquid crystal cell according to one embodiment of the present invention, which comprises a pair of glass substrates 3 and 3', liquid crystal layer 7 sandwiched between glass substrates, 3 and 3' and light reflector layer 8 comprising a polymeric medium, provided between liquid crystal layer 7 and lower substrate 3, as shown in FIG. 1. A large number of fine silver particles are precipitated on the surface of light reflector layer 8 to reflect light, though not shown in FIG. 1. When the polymeric medium mixture has a small silver content, the fine silver particles precipitated on the surface of light reflector layer 8 are so small in number as to bring them into no substantial mutual contact, thereby making the surface of light reflector layer 8 non-conductive. When the polymeric medium mixture has high content in silver, on the other hand, the fine silver particles precipitated on the surface of light reflector layer 8 is so large in number as to bring them into mutual dense contact, thereby making the surface of light reflector layer 8 electroconductive.

A process for forming light reflection layer 8 of reflection-type liquid crystal display device according to the embodiment of FIG. 1 comprises the following steps: appling a mixture comprising monovalent (univalent) silver and a polymeric medium to the surface of substrate 3; and heating light reflector layer 8 under a predetermined temperature condition, thereby precipitating fine silver particles on the surface of light reflector layer 8.

A process for preparing a mixture as materials for light reflector layer 8 and a practical procedure for producing the reflection-type liquid crystal display device of FIG. 1 using the thus prepared mixture are as follows;

That is, light reflector layer 8 for use in the reflection-type liquid crystal display device of the embodiment can be prepared in the following manner:

Silver (I) acetate and hexafluoroacetylacetone are mixed with dimethylacetamine desirably in a molar mixing ratio of silver (I) acetate to hexafluoroacetone of about 1 or less, and in a mixing ratio of hexafluoroacetylacetone to dimethylacetamide by weight of approximately 1 to prepare a solution. The resulting silver acetate solution is then mixed with a polyimide precursor varnish for forming an orientation layer desirably in a molar mixing ratio of about 1≧silver component in solution/polyimide component in solution≧ about 0.2. The resulting silver acetate-polyimide precursor solution is applied to a substrate, followed by heating and baking. Heating temperature and time can be selected, as desired, in view of species of polyimide precursor and concentrations of components in solution. The polyimide precursor converted to polyimide by the baking, and at the same time silver (I) is reduced to silver (O), which precipitates on the surface of the resulting polyimide film. The fine silver particle-precipitated film resulting from the heating and baking has a metallic luster and its reflectivity is about 50 to about 80% on the basis of the standard diffuser.

The polyimide precursor varnish is prepared as follows:

Equimolar amounts of 3,3'-4,4'-benzophenonetetracarboxylic dianhydride and 4,4'-oxydianiline are mixed with dimethylacetamide to prepare a polyimide precursor varnish. Then, as mentioned above, the silver (I) acetate-hexafluoroacetylacetone-dimethylacetamide solution is dropwise added to the polyimide precursor varnish and mixed together. The resulting solution is applied to glass substrate 3 by roll printing, and glass substrate 3 is then baked at 300° C. for one hour to form light reflector layer 8. After the baking, a silicon nitride layer is formed on light reflector layer 8 on glass substrate 3 as planarization layer 10. Furthermore, transparent electrode (ITO) 4 is formed thereon by sputtering, followed by formation of an electrode pattern by etching according to a photolithographic process. Insulating layer 9 and orientation layer 5 are successively formed thereon. On the other hand, transparent electrode 4 is formed on counterposing glass substrate 3', followed by formation of orientation layer 5 thereon.

Two retardation films or plates 2 are formed on the outer surface of counterposing glass substrate 3', followed by formation of polarizer film 1. Then, a pair of these substrate are coupled together through spacers 6 to sandwich liquid crystal layer 7 therebetween thereby preparing a reflection-type liquid crystal display device. The light reflector layer of the thus prepared liquid crystal display device has a high reflectivity, and the brightness in the bright display region can be 1.2 times higher than that of the conventional device owing to use of the internal light reflector layer and the single polarizer film.

Figure 2:
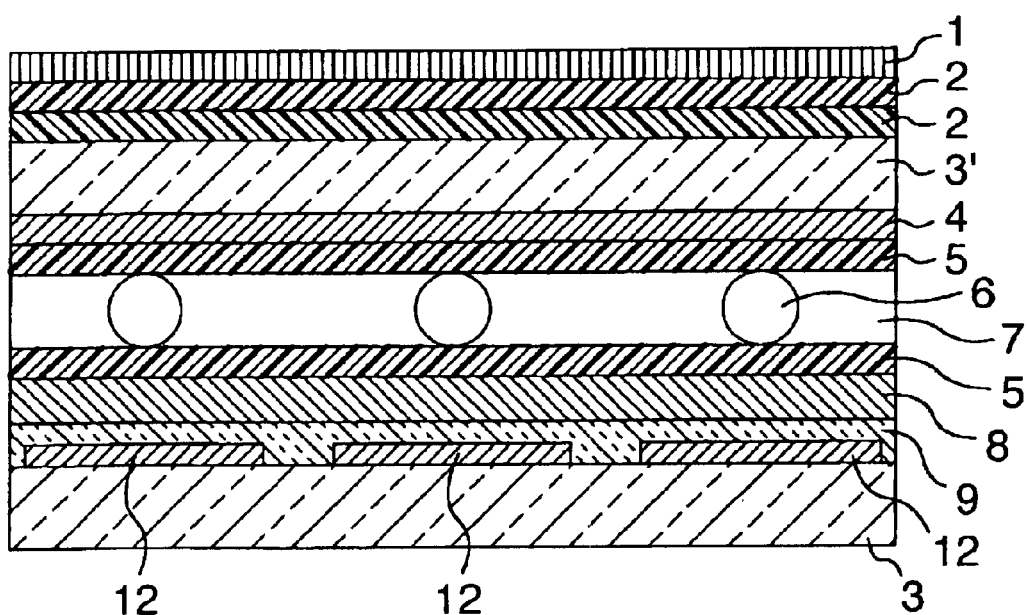
FIG. 2 is a schematic cross-sectional view of a reflection-type liquid crystal display device according to another embodiment of the present invention.

In the internal light reflector-type liquid crystal device of the present embodiment, the light-reflector layer may be provided above the electrode. FIG. 2 is a schematic cross-sectional view of a reflection-type liquid crystal device with a light reflector layer formed above the electrode, where fine silver particles are not shown in the drawing. Electrode 12 is provided between light reflector layer 8 and lower glass substrate 3 in this case, and thus it is not necessary that electrode 12 is transparent.

The device of FIG. 2 can be produced as follows:

At first, metallic electrode 12 of Cr materials is formed on glass substrate 3 according to a desired pattern by a well known process. Then, a silver acetate-polyimide precursor solution is prepared. The solution is applied to Cr electrode 12 formed or the surface of glass substrate 3, followed by heating and baking, in the same manner as in the case of the reflection-type liquid crystal device of FIG. 1. Furthermore, a polyimide precursor varnish is applied to light reflector layer 8 by roll printing, followed by heating and baking. Then, orientation layer 5 is formed by rubbing the surface of the resulting polyimide layer, thereby preparing a reflection-type liquid crystal display device. The thus prepared reflection-type liquid crystal display device has a distinguished display quality, because of low resistivity of the metallic electrode used.

Figure 3:
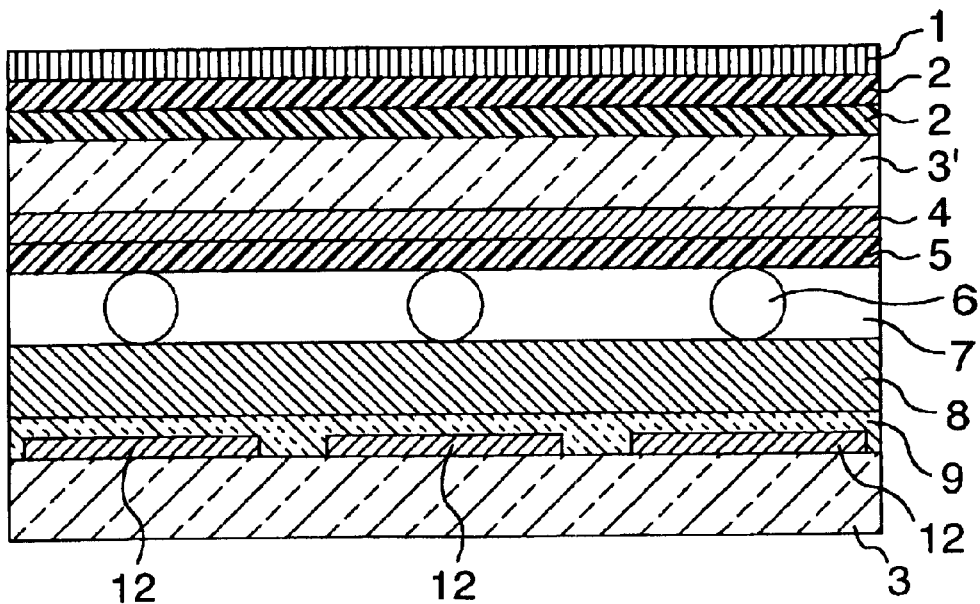
FIG. 3 is a schematic cross-sectional view of a reflection-type liquid crystal display device according to other embodiment of the present invention.

In case of forming electrode 12 below light reflector layer 8, as shown in FIG. 2, the light reflector layer can be made to act as a liquid crystal orientation layer by using a polyimide as a polymeric medium for light reflector layer 8. After application, and heating and baking of a silver acetate-polyimide precursor solution, the surface of the light reflector layer is rubbed. FIG. 3 is a schematic cross-sectional view of a reflection-type liquid crystal display device using the rubbed surface of the light reflector layer, where no fine silver particles are shown in the drawing. By making light reflector layer 8 act also as orientation layer 5 at lower substrate 3, the step of forming the orientation layer can be simplified and the production cost can be lowered. The rubbed light reflector layer has a good liquid crystal orientability.

When the present liquid crystal display device of internal light reflector layer type is provided with a color filter to be used for a color liquid crystal display device, the color liquid crystal display device has a high color purity in the color display and a good display quality, because of less gap between the light reflector layer and the color filter. Schematic cross-sectional views of color liquid crystal display devices of internal light reflector layer-type according to embodiments of the present invention are shown in FIGS. 4 and 5, where fine silver particles are not shown in the drawings.

Figure 4:
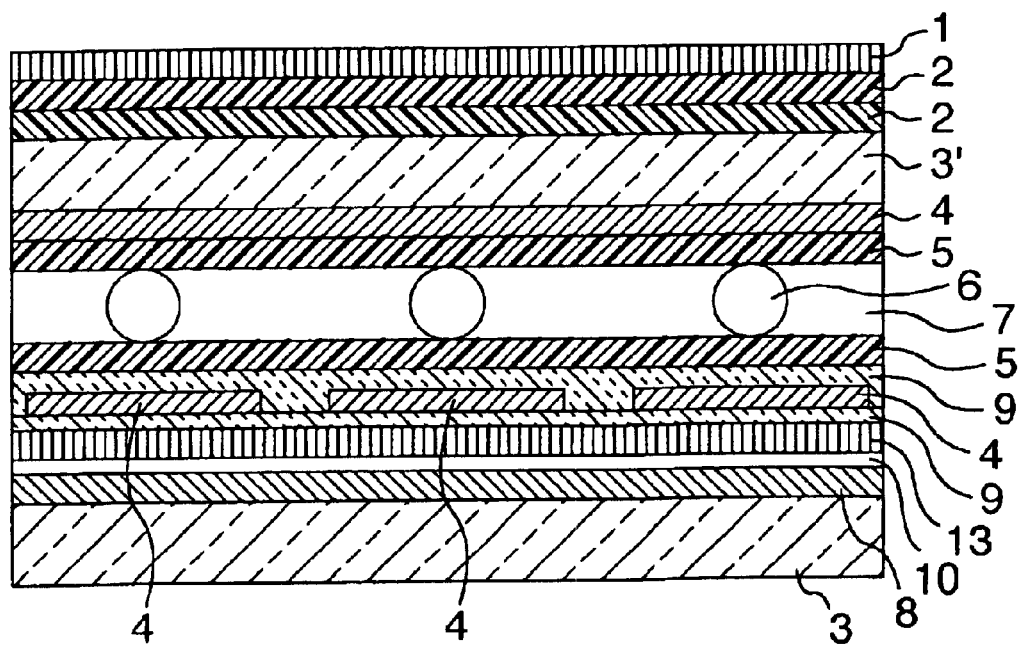
FIG. 4 is a schematic cross-sectional view of a reflection-type color liquid crystal display device according to further embodiment of the present invention.
Figure 5:
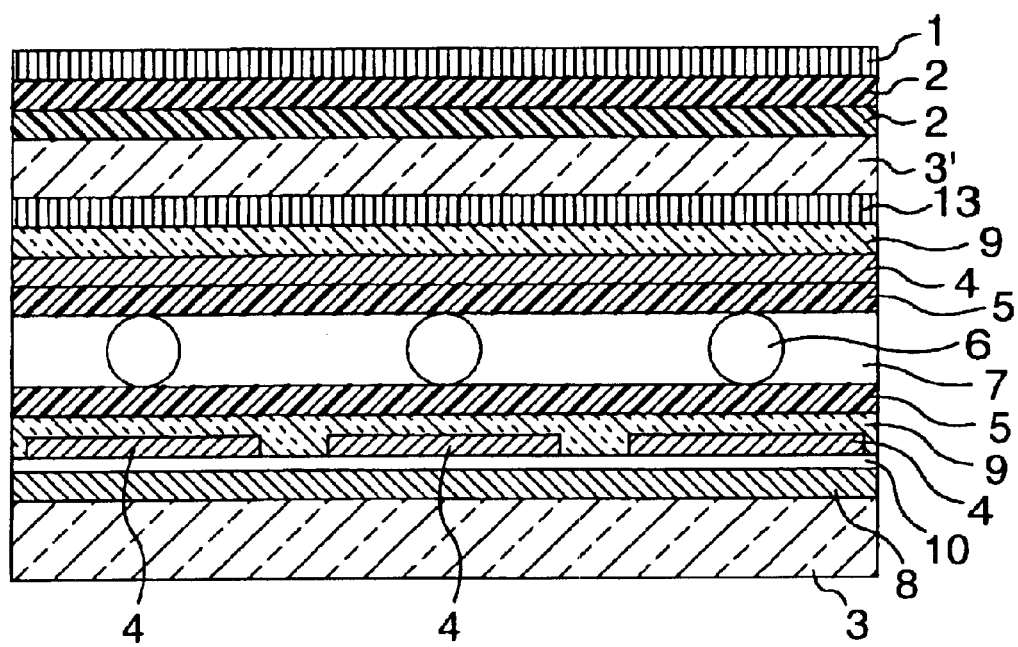
FIG. 5 is a schematic cross-sectional view of a reflection-type color liquid crystal display device according to still further embodiment of the present invention.

In FIG. 4, color filter 13 is formed on planization layer 10. In FIG. 5, color filter 13 is formed between upper substrate 3' and insulating layer 9.

A light reflector layer containing fine silver particles in a photosensitive polymeric medium will be described below.

A photosensitive polymeric medium can be easily patterned by light exposure or etching according to the photolithographic process. When the medium contains not less than 12% by weight of fine silver particles, the fine silver particles precipitated on the surface of the light reflector layer are larger in number than the those precipitated inside and thus are in mutual contact good enough to make the light reflector layer electroconductive. That is, the light reflector layer can act also as an electrode at the same time. In this case, the polymeric medium is photosensitive and thus an electrode of desired pattern can be easily formed according to the photolithographic process.

The amount of fine silver particles for making the surface of the light reflector layer having electro-conductivity may be 12 to 50% by weight on the basis of the medium. To prevent the light reflector layer from embrittlement, it is preferably 12 to 30% by weight. To make the light reflector layer non-conductive, it is less than 12% by weight.

According to further embodiment of the present invention, a layer having a good light scattering characteristic is provided to give a diffusibility to the light reflection characteristics. This is to prevent reflection of the background or a face of viewer on the light reflector layer, thereby giving a more bright reflection-type liquid crystal display device. Layer having a good light scattering characteristic for this purpose includes, for example, a layer having a plurality of fine regions of different refractive indices or a layer containing fine particles, etc.

The embodiment of using a light scattering layer will be described later, referring to FIG. 7.

By incorporating fine non-conductive particles into the photosensitive polymeric medium, the surface of the light reflector layer can be given unevenness with minute protuberances to obtain good light scatterability. The fine non-conductive particles preferably have good heat resistance and chemical resistance, and include, for example, fine $SiO_2$ particles, etc. When light is reflected on the light reflector layer, polarization of reflected light must be maintained. This can be attained by making the minute protuberances each of which has the size much larger than the wavelength of visible light. Embodiments of using fine particles for light scattering will be described later.

Preferable photosensitive polymeric medium is resins of photosensitive polyimide series, including, for example, negative type, polyimides such as photosensitive polyamic esters derived from pyromellitic acid (see JP-B-49-11541), photosensitive polyamic acid salts made from polyamic acid and unsaturated amine (see JP-A-54-145794), etc., and also positive type, polyimides such as photosensitive polyamic esters having nitrobenzyl groups (see JP-B-1-59571), photosensitive, heat-resisting materials made from polyamic acid and diazonaphthoquinone sulfonyl ester derivatives (see JP-A-4-168441 and JP-A-4-204738), photosensitive, heat-resisting materials made from polyamic ester having pendant-type, carboxylic acids and diazonaphthoquinone sulfonamide derivatives (see JP-A-10-3168), photosensitive, heat-resisting materials made from polyamic acid and urea-type, diazonaphthoquinone sulfonyl derivatives (see Japanese Patent Application No. 9-16755), etc.

All the foregoing polyimides have excellent heat-stability. Particularly, when the light reflector layer acts also as an electrode for applying a voltage to the liquid crystal layer, the electrode is connected to drive the circuits by heat welding through an anisotropic electroconductive film, etc. The polyimides for this purpose are distingnished in less deterioration by heat. Thus, desirable polyimide must have a higher glass transition temperature than the heating temperature for the heat welding.

Fine silver particles contained in the polyimide are in the form of monovalent (univalent) silver complex in the polyimide. By heating, the monovalent silver complexes are reduced to the precipitate on the surface of the polyimide. A method of mixing monovalent silver complexes into a polyimide precursor varnish and applying the varnish, followed by heating and baking to reduce the monovalent silver to zero-valent silver in the polymeric medium of the varnish and precipitate the zero-valent silver is disclosed in R. E. Southward et al: Chemistry of Materials, Vol. 7, pp. 2171–2180 (1995) and R. E. Southward et. al: Chemistry of Materials, Vol. 9, pp. 501–510 (1997).

That is, a reflection-type liquid crystal display device can be simply made by applying a photosensitive polyimide precursor containing monovalent silver complexes to a substrate, and forming a desired pattern by light exposure and etching, followed by heating and baking, thereby forming a light reflector layer acting also as an electrode.

On the substrate are formed an electrode for applying driving voltages to the liquid crystal layer, active elements such as TFTs, etc. for controlling a voltage to the electrode, and signal lines such as source bus lines, gate bus lines, etc. for transmitting driving signals to the active elements. When the light reflector layer acts also as an electrode, an insulating layer for insulation between the signal lines and the electrodes is formed, when required, and such embodiments will be described later, referring to FIGS. 11A, 11B, 12A, 12B and 12C.

Another embodiment of a process for making a light reflector layer from a photosensitive polymeric medium for use in the present reflection-type liquid crystal display device will be described below:

Silver (I) acetate and trifluoroacetylacetone are mixed into dimethylacetamide in a molar mixing ratio of 1.5≦trifluoroacetylacetone/silver (I) acetate≦2 and also in a mixing ratio of trifluoroacetylacetone/dimethylacetamide of about 1 by weight.

The thus prepared silver acetate solution is mixed with a polyimide precursor varnish for making an orientation layer preferably in such a mixing ration as to precipitate at least 12% by weight of silver, based on the entire mixture, in the polyimide by reduction of silver (I) acetate by heating and baking.

The thus prepared silver acetate-polyimide precursor solution is applied to a substrate for liquid crystal cell, and the solvent is removed therefrom by heating. Then, a desired pattern is formed by light exposure and etching according to a photolithographic process, followed by heating and baking. Heating temperature and time can be selected, as desired, in view of the species of polyimide precursor and concentrations of components in the solution.

The polyimide precursor is converted to polyimides by baking, and silver (I) acetate is reduced to silver (O) at the same time and precipitates in the polyimide layer or on the surface thereof. By rubbing the layer surface with cloth, etc., a reflectivity of about 50 to about 80% on the basis of the standard diffuser can be obtained.

Figure 6:
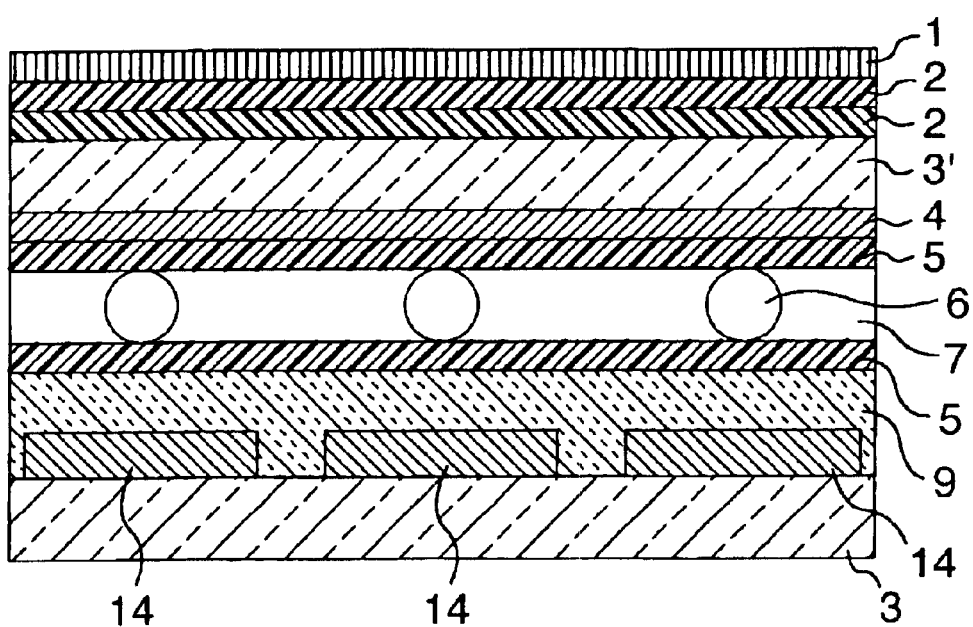
FIG. 6 is a schematic cross-sectional view of a reflection-type liquid crystal display device according to still further embodiment of the present invention.

FIG. 6 is a schematic cross-sectional view of a reflection-type liquid crystal display device according to further embodiment of the present invention, where five silver particles are not shown in the drawing.

Process for producing the device of FIG. 6 will be described below:

At first, 6.7 ml (120 m mol) of triethylamine is dropwise added at 10° C. to 50 ml of a solution in dixane containing 10.8 g (40 m mol) of 2-naphtoquinone-2-diazido-5-sulfonyl chloride and 4.00 g (20.0 m mol) of 4,4'-diaminophenyl ether, followed by stirring at room temperature for 3 hours. After filtration, the filtrate is dropwise added to 2 l of an aqueous 1 N hydrochloric acid solution, whereby 12.5 g of 4.4'-bis(1,2-naphthoquinone-2-diazido-5-sulfonylamino) diphenyl ether was obtained (yield: 94%).

A mixture solution consisting of 12.3 g (38.3 m mol) of benzophononetetracarboxylic dianhydride (BTD A) and 12.0 g (162 m mol) of butanol is stirred under reflux for one hour. Excess butanol is removed therefrom under reduced pressure. After addition of 50 ml of benzene to the residue, 11.0 g (46.0 m mol) of thionyl chloride is dropwise added thereto at room temperature. Reaction mixture is stirred under reflux for one hour. Excess thionyl chloride is removed therefrom under reduced pressure, whereby a solid of corresponding dibutyl dichlorobenzophenonetetracarboxylate (BTD Nbu Cl) is obtained.

Then, 40 ml of solution in N-methyl-2-pyrrolidone (NMP) containing 3.06 g (15.3 m mol) of diaminodiphenylether (DDE) and 3.50 g (23.0 m mol) of 3.5-diaminobenzoic acid is dropwise added to 50 ml of solution in NMP of BTD Bu Cl as obtained above, while maintaining the latter solution at not higher than 5° C., followed by stirring at room temperature for 30 minutes. After filtration, the filtrate is dropwise added to 3 l of water, whereby a solid of polyamic ester having a dibutyl benzophenonetetracarboxylate structure is obtained.

A solution in NMP containing 12% by weight of polyamic ester as solid matters is prepared, and 25% by weight of 4,4'-bis(1,2-naphthoquinone-2-diazido-5-sulfonylamino) diphenyl ether, based on the solid matters, is added to the solution, whereby a solution of photosensitive resin composition is obtained.

The solution of photosensitive resin composition and said silver acetate solution are mixed together, and the resulting mixture is applied to glass substrate 3, one of the pair of glass substrates, by roll printing, followed by heating glass plate 3 at 100° C. for one hour, thereby removing the solvent therefrom. Then, glass plate 3 is exposed to high pressure mercury lamp light at 500 mJ/cm$^2$ through a light shield mask of electrode pattern, followed by development in NMD3 (3.38% tetramethylammonium hydroxide) for 80 seconds, whereby an electrode pattern is obtained with a normalized remained film thickness of 85%.

After the electrode pattern formation, glass substrate 3 is baked at 340° C. for one hour, whereby light reflector layer 14 acting also as an electrode can be formed.

Insulating layer 9 and orientation layer 5 are successively formed on light reflector layer 14 acting also as an electrode on glass substrate 3. Insulating layer 9 and orientation layer 5 may be a single layer acting as the insulating layer and the orientation layer at the same time. When a polyimide having a composition similar to that of the polyimide for the light reflector layer is used for the single layer acting as the insulating layer and the orientation layer in this case, the resulting single layer can have a good adhesion to the light reflector layer.

On the other hand, transparent electrode 4 is formed on glass electrode 3' confronted with another glass substrate 3, on which light reflector layer 14 acting also as an electrode is formed. Orientation layer 5 is further formed on transparent electrode 4.

A pair of substrates 3 and 3' are coupled together through spacers 6 and liquid crystal layer 7 is sandwiched therebetween.

Furthermore, retardation films 2 and polarizer film 1 are successively pasted to the outer surface of glass substrate 3' prepare a reflection-type liquid crystal display device. The light reflector layer of the thus prepared reflection-type liquid crystal display device of internal light reflector type has a high reflectivity, and the brightness in the bright display region can be 1.2 times higher than that of the conventional device owing to use of the single polarizer film.

Figure 7:
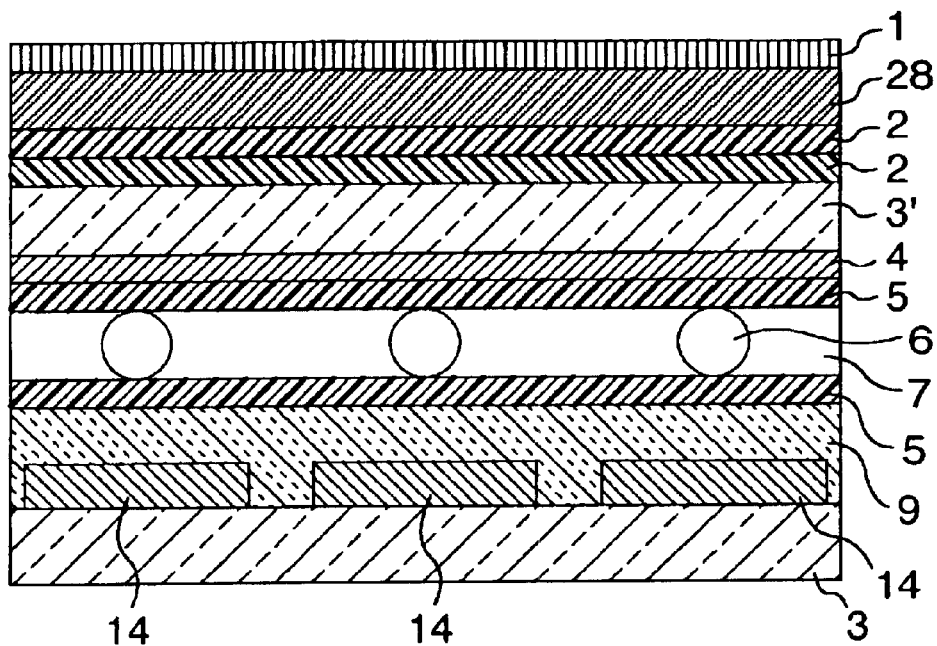
FIG. 7 is a schematic cross-sectional view of a reflection-type liquid crystal display device according to still further embodiment of the present invention.

Furthermore, a light-controlling film having a good light scattering characteristic can be provided to prevent reflection of the background or a face of viewer on the light reflector layer, thereby giving a more bright reflection-type liquid crystal display device of good image quality, as shown in FIG. 7, where fine silver particles are not shown in the drawing. Difference of this embodiment from the reflection-type liquid crystal display device of FIG. 6 is the presence of light-controlling film 28 between polarizer film 1 and retardation films 2. The light-controlling film used in the present embodiment is a film containing fine particles having a different refraction index from that of the film matrix. Reflection of the background or a face of viewer on the light reflector layer can be eliminated, and a more bright reflection-type liquid crystal display device of good image quality can be obtained. The light-controlling film can be used in the embodiments of FIGS. 1 to 4.

Furthermore, the light reflector layer can be prevented from mirror surface formation by dispersing fine non-conductive particles in the light reflector layer. An appropriate light scatterbility can be obtained thereby.

Figure 8:
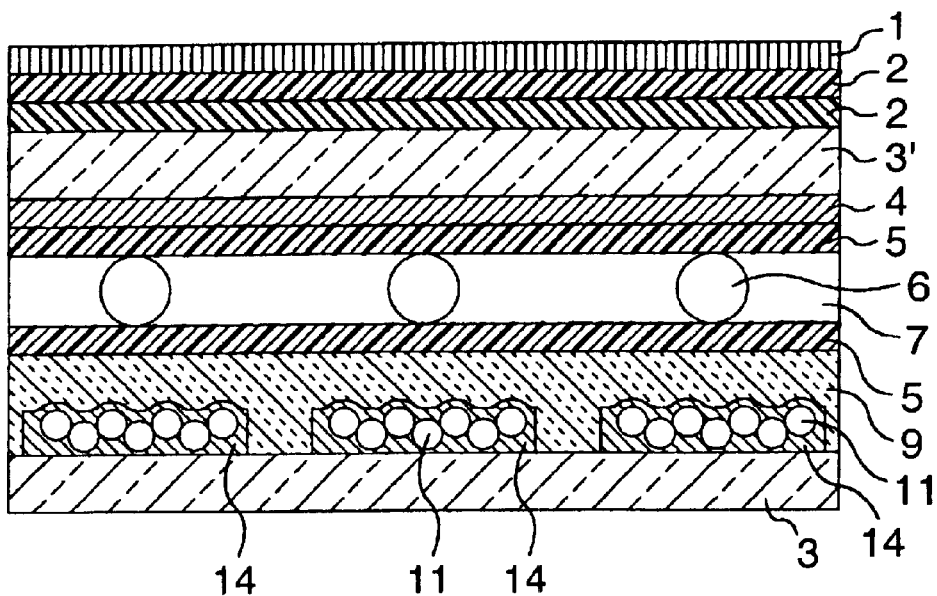
FIG. 8 is a schematic cross-sectional view of a reflection-type liquid crystal display device according to still further embodiment of the present invention.

FIG. 8 is a schematic cross-sectional view of a reflection-type liquid crystal display device with a good light scattering effect by incorporating fine non-conductive particles into the light reflector layer, where fine silver particles are not shown in the drawing.

The device of FIG. 8 can be produced as follows:

A silver (I) acetate-polyimide precursor solution is prepared in the same manner as in case of the reflection-type liquid crystal display device of FIG. 6, and then fine $SiO_2$ particles are dispersed therein as fine non-conductive particles 11. An amount of fine $SiO_2$ particles are adjusted so as to form about 50 to about 100 pieces of minute protuberances per each pixel. Then, the fine $SiO_2$ particles-dispersed solution of photosensitive resin composition is applied to glass substrate 3 and exposed to light to form a pattern, followed by heating and baking to form light reflector layer 14 acting also as an electrode in the same manner as in case of the reflection-type liquid crystal display device. By dispersion of fine $SiO_2$ particles in the solution, an uneven surface are formed on the light reflector layer, whereby a light scatterability can be obtained.

Preferable fine particles for giving a light scatterability are those which have distingnished chemical resistance and heat resistance without any deterioration in an organic solvent or by heating and baking, desirably with different refraction index from that of the polymeric medium of the photosensitive resin composition. Furthermore, it is important that the polarization of the incident light is maintained after reflection at the uneven surface. In this embodiment, the minute protuberances, each about 10 $\mu$m in diameter and about 1 $\mu$m in height, are formed on the reflector layer.

Insulating layer 9 on the light reflector layer function as a planarization layer to control cell gap fluctuations due to the uneven surface formation. For insulating layer 9, silicon nitride is used in this embodiment. Insulating layer 9 can be made not only from inorganic materials, but also from organic materials such as polyimide, benzocyclobutene, etc. It is preferable to that insulating layer 9 is made from polyimide similar to the component of the light reflector layer, because adhesion of the insulating layer to the light reflector layer can be much more improved. As already mentioned before, the insulating layer with a planarization effect may be the same as the orientation layer.

Figure 9:
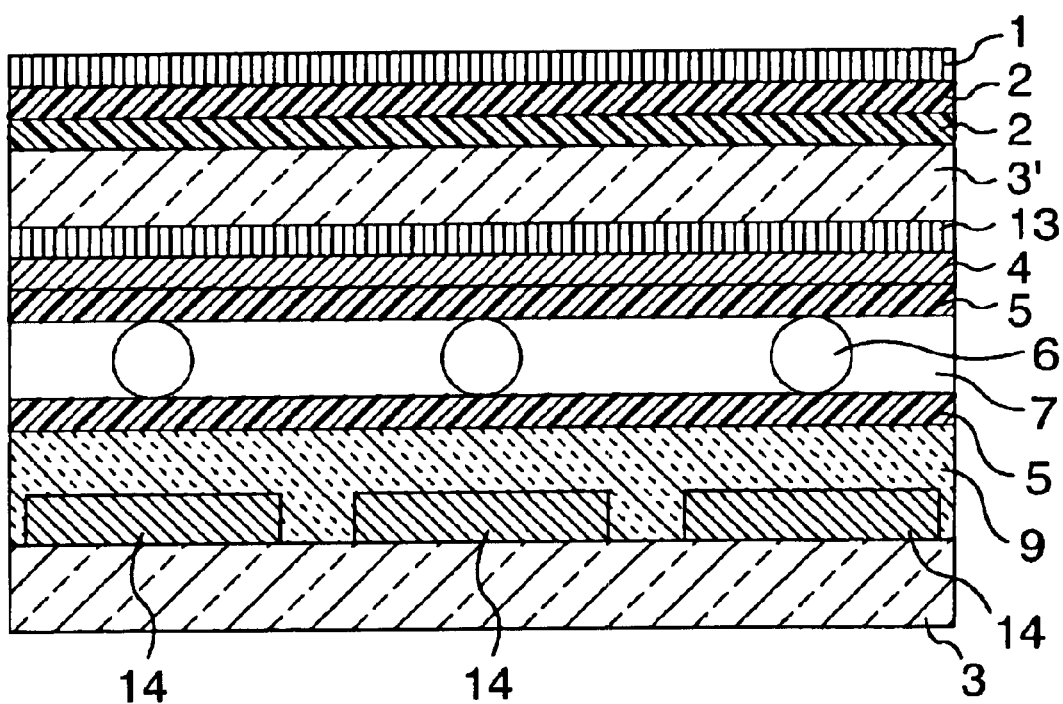
FIG. 9 is a schematic cross-sectional view of a reflection-type color liquid crystal display device according to still further embodiment of the present invention.

FIG. 9 is a schematic cross-sectional view of a color liquid crystal display device of internal light reflector type according to further embodiment of the present invention, where fine silver particles are not shown in the drawing.

Device of FIG. 9 can be produced as follows;

A silver (I) acetate-polyimide precursor solution is prepared and applied to glass substrate 3 by roll printing, followed by light exposure and etching according to a photolithographic process, thereby forming an electrode pattern. Then, glass electrode 3 is subjected to heating and baking to form light reflector layer 14 acting also as an electrode. Furthermore, insulating layer 9 and orientation layer 5 are formed on light reflector layer 14 acting as an electrode in the same manner as in case of the reflection-type liquid crystal display device of FIG. 6.

On the other hand, color filter 13, transparent electrode 4 and orientation layer 5 are successively formed on substrate 3' opposed to glass substrate 3 with light reflector layer 14 acting also as an electrode as formed thereon. Then, glass substrates 3 and 3' are coupled together through spacers 6, and liquid crystal layer 7 is sandwiched therebetween to produce a color liquid crystal display device of internal light reflector-type.

The present internal reflector type color liquid crystal display device using a color filter has a high color purity the color display and a distinguished display quality owing to narrower gap between the light reflector layer and the color filter.

Figure 10A:
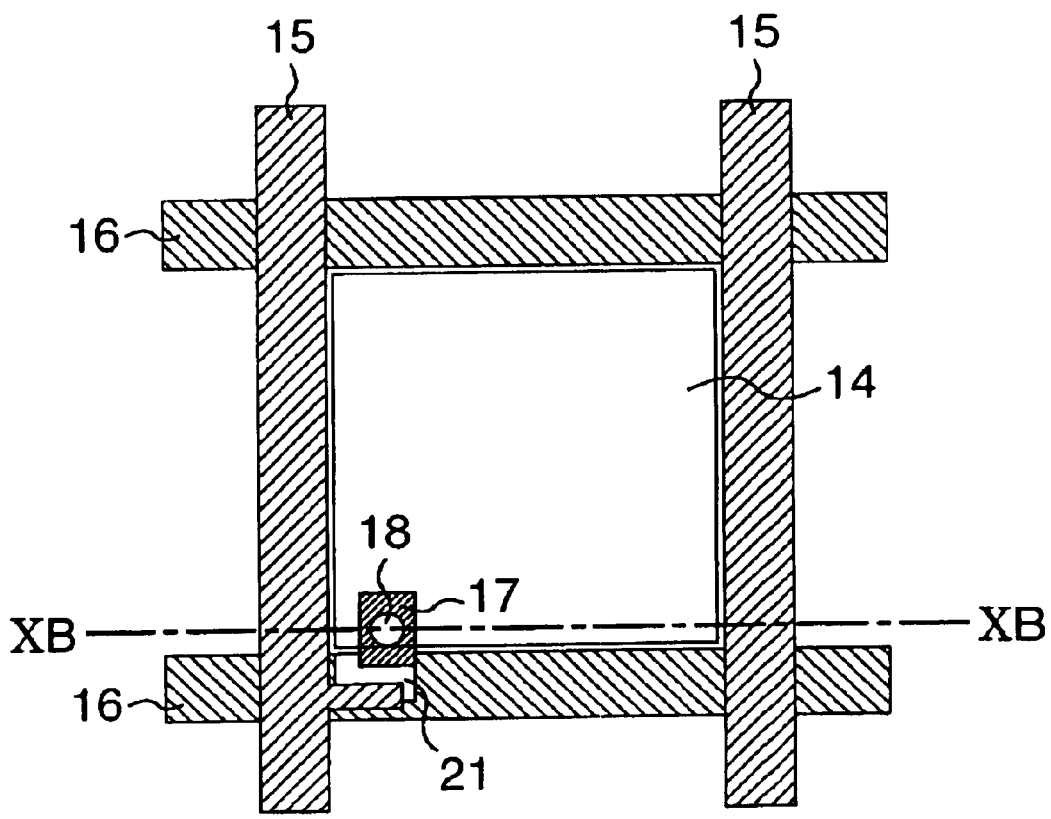
FIGS. 10A and 10B are a plan view and a cross-sectional view of a unit pixel structure of a reflection-type TFT liquid crystal display device according to one embodiment of the present invention, respectively.
Figure 10B:
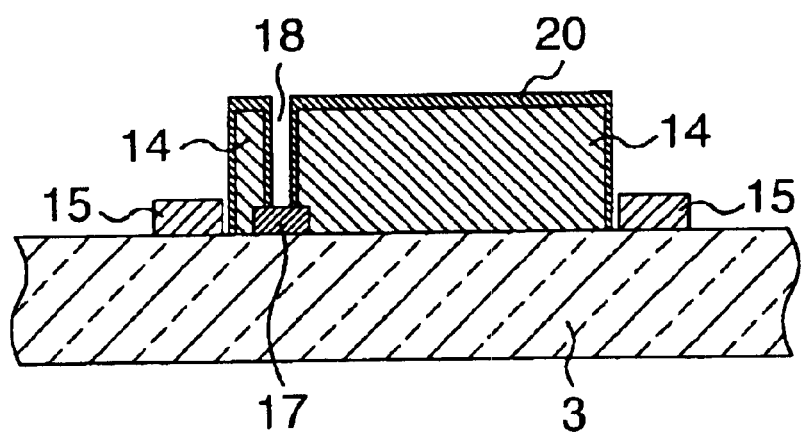

FIGS. 10A and 10B are a plan view and a cross-sectional view of unit pixel structure of a reflection type TFT-LCD (thin film transistor-liquid crystal display) with a through hole as formed, respectively, where FIG. 10B is a cross-sectional view along line XB of FIG. 10A.

Device of FIGS. 10A and 10B is produced as follows:

After formation of source bus lines 15, gate bus lines 16. semiconductor (channel region) layer 21 and drain electrode 17 as signal wirings on glass substrate 3, a silver. (I) acetate-polyimide precursor solution is prepared and applied to glass substrate 3 by roll printing, followed by light exposure and etching according to a photolighographic process, thereby forming electrode pattern 14. Through hole 18 for electrically connecting drain electrode 17 to a light reflector layer acting also an electrode is formed through electrode pattern 14 at the same time.

Electrode pattern 14 made from the silver (I) acetate-polyimide precursor solution by patterning, when heated, gives rise to precipitation of fine silver particles on the surface to form light reflector layer 20. Light reflector layer 20 contains fine silver particles at a high density and will become electro-conductive and act also as an electrode. At the same time, the inner wall of through hole 18 is filled up with precipitated fine silver particles, so that light reflector layer 20 acting also as electrode 14 is positioned above drain electrode 17 and is not light-transmissible, and drain electrode 17 is not visible actually, because it is covered by light reflector layer 20 acting also as electrode 14, but FIGS. 10A and 10B visibly show the arrangement of drain electrode 17 merely for easy understanding purpose. The present light reflector layer is made from photosensitive materials and thus it is very easy to form through hole 18 for contact between the surface of light reflector layer 20 acting also as electrode 14 and drain electrode 17, and at the same time the fine silver particle layer precipitated by heating-reduction can attain electrical contact between light reflector layer 20 acting also as electrode 14 and drain electrode 17.

Figure 11A:
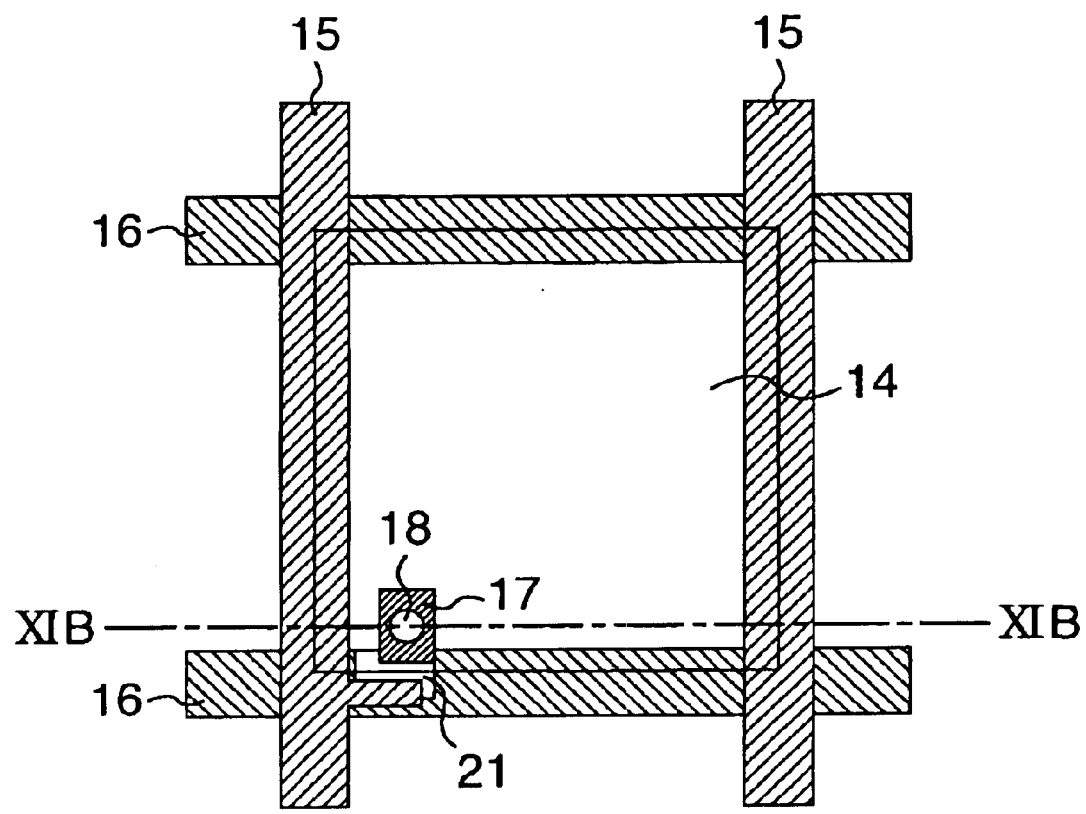
FIGS. 11A and 11B are a plan view and a cross-sectional view of a unit pixel structure of a reflection-type TFT liquid crystal display device according to another embodiment of the present invention, respectively.
Figure 11B:
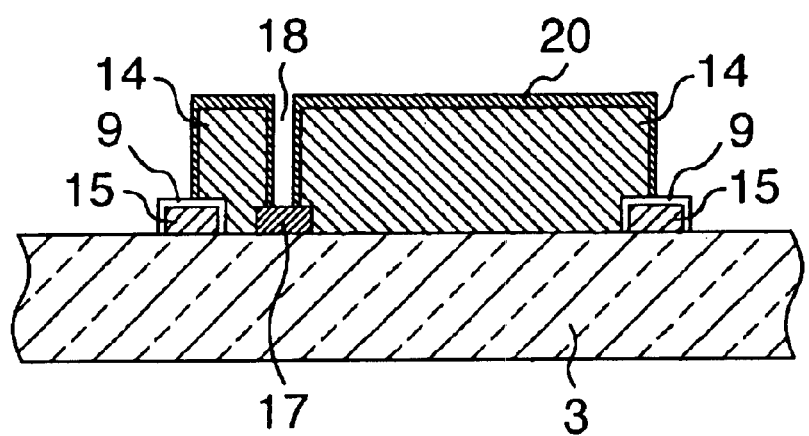

FIGS. 11A and 11B are a plan view and a cross-sectional view of further embodiment of the present invention, where FIG. 11B is a cross-sectional view along line XIB of FIG. 11A.

In this embodiment, both edge sides of light reflector layer 20 are on adjacent source bus lines 15, and thus insulating layer 9 for making insulating between source bus line 15 and light reflector layer 20 acting also as electrode 14 is provided on source bus lines 15. Insulating layer 9 is likewise provided between gate bus line 16 and light reflector layer 20 acting also as electrode 14, though not shown in the drawings. For insulating layer 9, silicon nitride is used.

FIGS. 12A, 12B and 12C show an arrangement of a plurality of the pixel structure of FIGS. 11A and 11B, where FIG. 12B is a cross-sectional view along line XIIB of FIG. 12A and FIG. 12C is a cross-sectional view along line XIIC of FIG. 12A.

In the embodiments shown in FIGS. 10A and 10B and in FIGS. 11A and 11B, the light reflection layer 14 are formed on the square region surrounded by the source bus lines 15 and the gate bus lines 16. On the other hand, in the embodiment shown in FIGS. 12A–12C, the light reflection layer 14 is formed just above the intersection of the source bus line 15 and the gate bus line 16.

Figure 13:
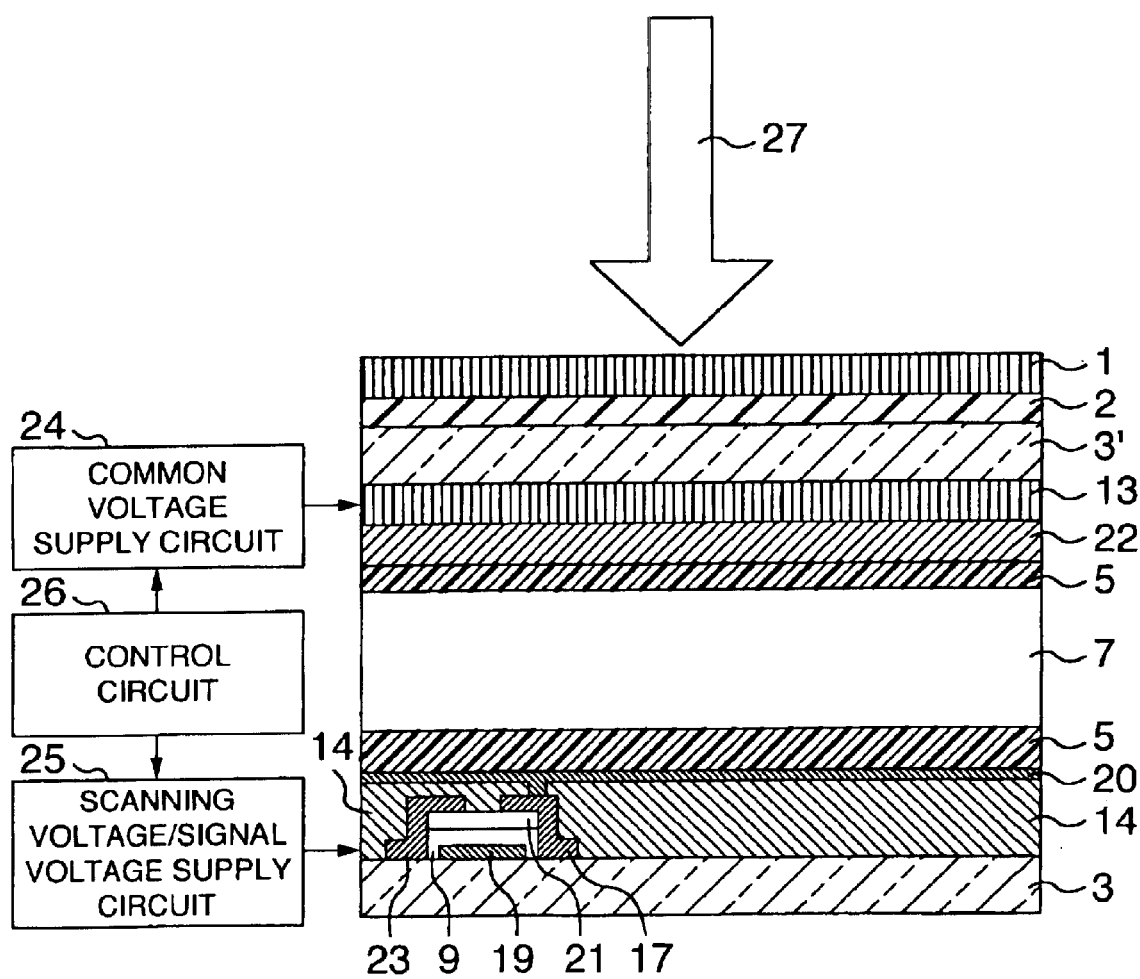
FIG. 13 is a schematic cross-sectional view of a reflection-type TFF liquid crystal display device with the structure of peripheral circuits for the active elements in the embodiment of FIG. 12A.

FIG. 13 is a schematic cross-sectional view of a reflection-type TFT-LCD with the structure of active elements 9, 17–19, 21 and 23 and peripheral circuits 24–26. FIG. 13 is a cross-sectional view along line XIII of FIG. 12A. Voltage is supplied to common electrode 22 from common voltage supply circuit 24, and scanning voltage/signal voltage is supplied to gate electrode 19 and source electrode 23 from scanning voltage/signal voltage supply circuit 25, thereby applying a voltage to liquid crystal layer 7 between light reflector layer 20 acting an electrode 14 and common electrode 22 to actuate the liquid crystals. Various images can be displayed by controlling a quantity of incident light 27. Control circuit 26 controls signal generation timing, etc. of common voltage supply circuit 24 and scanning voltage/signal voltage supply circuit 25.

The reflection-type TFT-LCD is of an internal light reflector type and thus has a high color purity in the color display and a distinguished display quality, because of narrower gap between the light reflector layer and the color filter, as in the foregoing embodiments.

The present invention provides a reflection-type liquid crystal display device with a bright display quality at a low cost.

What is claimed is:

1. A reflection-type liquid crystal display device, which comprises a pair of substrates, at least one of which is transparent, a liquid crystal layer sandwiched between the pair of substrates, and a light reflector section provided between the liquid crystal layer and one of the pair of substrates, said light reflector section including a polymeric medium layer with fine silver particles precipitated on the surface, wherein the polymeric medium is composed of a silver-containing polyimide, the polyimide containing the fine silver particles formed by reduction of monovalent silver.

2. A reflection-type liquid crystal display device according to claim 1, wherein the surface of the polymeric medium at the light reflector section controls orientation of liquid crystal molecules in the liquid crystal layer.

3. A reflection-type liquid crystal display device according to claim 1, wherein an electrode layer is further formed on one of the substrates, and the light reflector section is provided between the electrode layer and the liquid crystal layer.

4. A reflection-type liquid crystal display device according to claim 1, wherein a color filter is further provided between the light reflector section and the liquid crystal layer.

5. A reflection-type liquid crystal display device according to claim 1, wherein a color filter is further provided between the substrate confronted with the substrate with the light reflector section as formed thereon and the liquid crystal layer.

6. A reflection-type liquid crystal display device, which comprises a pair of substrates, at least one of which is transparent, a liquid crystal layer sandwiched between the pair of substrates, and a light reflector section provided between the liquid crystal layer and one of the pair of substrates, said light reflector section including a polymeric medium layer with fine silver particles precipitated on the surface, wherein the light reflector section has a light reflector layer formed from a silver-containing photosensitive polymeric medium according to a photolithographic process, and the light reflector layer contains the fine silver particles so precipitated as to give electrical conduction through their mutual contact.

7. A reflection-type liquid crystal display device according to claim 6, wherein the photosensitive polymeric medium contains 12 to 50% by weight of silver.

8. A reflection-type liquid crystal display device according to claim 6 or 7, wherein the photosensitive polymeric medium includes a photosensitive polyimide.

9. A reflection-type liquid crystal display device according to claim 6 or 7, wherein the fine silver particles are precipitates formed by heating the photosensitive polymeric medium to a predetermined temperature, thereby reducing monovalent silver contained in the medium.

10. A reflection-type liquid crystal display device according to claim 6, wherein a color filter is further provided between the substrate confronted with the substrate with the light reflector section as formed thereon and the liquid crystal layer.

11. A reflection type liquid crystal display device according to claim 6 or 7, wherein the light reflector layer acts also as an electrode for applying a voltage to the liquid crystal layer.

12. A reflection-type liquid crystal display device according to claim 11, wherein a wiring layer for actuating the electrode is further provided and an electro-conductive path for giving an electrical connection between the wiring layer and the electrode is formed at the light reflector section.

13. A reflection-type liquid crystal display device according to claim 11, wherein a wiring layer for actuating the electrode and an insulating layer for giving insulation between the wiring layer and the electrode are provided.

14. A reflection-type liquid crystal display device according to any one of claims 1, 6 and 7, where a scattering layer for scattering the light reflected at the light reflector section is further provided.

15. A reflection-type liquid crystal display device according to anyone of claims 1, 6 and 7, wherein the polymeric medium at the light reflector section contains fine non-conductive particles which give a light scaterability to the surface of the polymeric medium.

16. A reflection-type liquid crystal display device according to claim 15, wherein a plurality of asperities having a diameter of about 10 $\mu$m and a height of about 1 $\mu$m are formed by the fine non-conductive particles on the surface of the polymeric medium layer with the precipitated fine silver particles.

17. A process for producing a reflection-type liquid crystal display device, which comprises steps of:

applying a mixture containing monovalent silver and a photosensitive polymeric medium to a substrate;

forming a light reflector layer of the mixture;

precipitating fine silver particles on the surface of the light reflector layer; and confronting a transparent substrate with said substrate on which the light reflector layer is formed, and sandwiching a liquid crystal layer between the substrates.

18. A process according to claim 17, wherein the step of forming a light reflector layer of the mixture includes exposing the mixture to light, thereby photolithographically forming the light reflector layer of a desired pattern, and the step of precipitating fine silver particles on the surface of the light reflector layer includes heating the light reflector layer under a predetermined temperature condition, thereby precipitating the fine silver particles on the surface of the light reflector layer.

19. A process for producing a reflection-type liquid display device, which comprises steps of:

forming an electrode for actuating liquid crystals on a substrate;

forming an insulating layer on the electrode;

applying a mixture containing monovalent silver and a photosensitive polymeric medium on the insulating layer;

exposing the mixture to light, thereby photolithographically forming a light reflector layer of desired pattern;

heating the light reflector layer under a predetermined temperature condition, thereby precipitating fine silver particles on the surface of the light reflector layer; and confronting a transparent substrate with said substrate on which the light reflector layer is formed, and sandwiching a liquid crystal layer between the substrates.

20. A process according to claim 17 or 19, wherein the surface of the polymeric medium in the light reflector layer controls orientation of liquid crystal molecules in the liquid crystal layer.

21. A process according to claim 20, which further comprises a step of forming a light-scattering layer for scattering the light reflected on the light reflector layer.

22. A process according to claim or 17 or 19, wherein the fine silver particles precipitated on the surface of the light reflector layer give an electrical conduction through their mutual contact.

23. A process according to claim 22, wherein the photosensitive polymer medium contains 12 to 50% by weight of silver.

24. A process according to claim 22, wherein the light reflector layer acts also as an electrode for applying a voltage to the liquid crystal layer, and the desired pattern is a pattern of the electrode.

25. A process according to claim 17 or 19, which further comprises a step of forming a light-scattering layer for scattering the light reflected on the light reflector layer.

26. A process according to claim 25, which further comprises a step of forming a wiring layer for actuating the electrode on the substrate, and a step of forming an electro-conductive path for giving an electrical connection between the wiring layer and the electrode through the light reflector layer.

27. A process according to claim 25, which further comprises a step of forming a wiring layer for actuating the electrode on the light reflector layer and a step of forming an insulating layer for giving insulating between the wiring layer and the electrode.

28. A process according to claim 17 or 19, wherein the polymeric medium contains fine non-conductive particles for giving a light scatterability to the surface of the light reflector layer.

29. A system comprising:

a reflection-type liquid crystal display device, which includes a pair of substrates, at least one of which is transparent, a liquid crystal layer sandwiched between the pair of substrates, and a light reflector section provided between the liquid crystal layer and one of the pair of substrates, said light reflector section including a polymeric medium layer with fine silver particles precipitated on the surface, wherein the polymeric medium is composed of a silver-containing polyimide, the polyimide containing the fine silver particles formed by reduction of monovalent silver; and, at least one of supportive circuitry to operate the reflection-type liquid crystal display device, a power supply and a housing.

30. A system according to claim 29, wherein the surface of the polymeric medium at the light reflector section controls orientation of liquid crystal molecules in the liquid crystal layer.

31. A system according to claim 29, wherein an electrode layer is further formed on one of the substrates, and the light reflector section is provided between the electrode layer and the liquid crystal layer.

32. A system according to claim 29, wherein a color filter is further provided between the light reflector section and the liquid crystal layer.

33. A system according to claim 29, wherein a color filter is further provided between the substrate confronted with the substrate with the light reflector section as formed thereon and the liquid crystal layer.

34. A system according to claim 29, wherein light reflector layer of the light reflector section acts also as an electrode for applying a voltage to the liquid crystal layer.

35. A system according to claim 34, wherein a wiring layer for actuating the electrode is further provided and an electro-conductive path for giving an electrical connection between the wiring layer and the electrode is formed at the light reflector section.

36. A system according to claim 34, wherein a wiring layer for actuating the electrode and an insulating layer for giving insulation between the wiring layer and the electrode are provided.

37. A system according to claim 29, where a scattering layer for scattering the light reflected at the light reflector section is further provided.

38. A system according to claim 29, wherein the polymeric medium at the light reflector section contains fine non-conductive particles which give a light scaterability to the surface of the polymeric medium.

39. A system according to claim 38, wherein a plurality of asperities having a diameter of about 10 $\mu$m and a height of about 1 $\mu$m are formed by the fine non-conductive particles on the surface of the polymeric medium layer with the precipitated fine silver particles.

40. A system according to claim 29, wherein the polymeric medium includes a photosensitive polyimide.

* * * * *